(12) United States Patent
Janakiraman et al.

(10) Patent No.: US 7,805,290 B2
(45) Date of Patent: *Sep. 28, 2010

(54) METHOD, APPARATUS, AND PROGRAM FOR TRANSLITERATION OF DOCUMENTS IN VARIOUS INDIAN LANGUAGES

(75) Inventors: Janani Janakiraman, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/051,966

(22) Filed: Mar. 20, 2008

(65) Prior Publication Data

US 2008/0167856 A1    Jul. 10, 2008

Related U.S. Application Data

(63) Continuation of application No. 10/645,037, filed on Aug. 21, 2003, now Pat. No. 7,369,986.

(51) Int. Cl.
*G06F 17/20* (2006.01)
*G06F 17/28* (2006.01)
(52) U.S. Cl. ................... 704/8; 704/2; 704/277
(58) Field of Classification Search ............ None
See application file for complete search history.

(56) References Cited

U.S. PATENT DOCUMENTS

| | | | |
|---|---|---|---|
| 4,774,666 A | 9/1988 | Miyao et al. | |
| 5,432,948 A | 7/1995 | Davis et al. | |
| 5,640,587 A | 6/1997 | Davis et al. | |
| 6,389,386 B1 | 5/2002 | Hetherington et al. | |
| 6,411,948 B1 | 6/2002 | Hetherington et al. | |
| 6,407,754 B1 | 7/2002 | Hetherington et al. | |
| 6,421,680 B1 | 7/2002 | Kumhyr et al. | |
| 6,460,015 B1 | 10/2002 | Hetherington et al. | |
| 6,810,374 B2 | 10/2004 | Kang | |
| 7,177,794 B2 | 2/2007 | Mani et al. | |

OTHER PUBLICATIONS

"Microsoft Computer Dictionary, Fifth Edition", Microsoft Press, Redmond, Washington, 2002, p. 409.

Siha et al., "A Modular Data Terminal for Indian Languages", ACM SIGGRAPH Computer Graphics, vol. 14, Issue 1-2, Jul. 1980, pp. 39-72.

"Transliteration of Indic Scripts", Web Printout From http://www.archive.org, Archive on Oct. 20, 2002, available at: http://web.archive.org/web/20021020065731/http://homepage.ntlworld.com/stone-catend/trind.htm.

*Primary Examiner*—Brian L Albertalli
(74) *Attorney, Agent, or Firm*—Yee & Associates, P.C.; Libby Z. Toub

(57) ABSTRACT

A transliteration mechanism is provided that allows a user to view a text in one Indian language, to highlight a word or phrase, and to easily transliterate the selected word or phrase into a target language or script. The mechanism may be an application, an applet, or a plug-in to another application, such as a Web browser. The target language and/or script may be stored in a user profile. Preferably, the source language may be any known Indian language in any known script.

6 Claims, 7 Drawing Sheets

440

TAMIL VERSION

| ரயில் எண் | தேதி | ஊர | புறபபடும் நேரம | ஊர | வரும நேரம |
|---|---|---|---|---|---|
| 1234 | 7-1-2003 | சென்னை | 7:20 | திருச்சி | 14:25 |
| 4325 | 7-1-2003 | திருச்சி | 5:30 | சென்னை | 13:20 |

*FIG. 5A*

TRANSLITERATED VERSION

| RAYIL YEN | THETHI | OOR | PURAPPATUM NERUM | OOR | VARUM NERUM |
|---|---|---|---|---|---|
| 1234 | 7-1-2003 | CHENNAI | 7:20 | TIRUCHY | 14:25 |
| 4325 | 7-1-2003 | TIRUCHY | 5:30 | CHENNAI | 13:20 |

*FIG. 5B*

ENGLISH VERSION

| TRAIN NUMBER | DATE | CITY | DEPARTURE TIME | CITY | ARRIVAL TIME |
|---|---|---|---|---|---|
| 1234 | 7-1-2003 | CHENNAI | 7:20 | TIRUCHY | 14:25 |
| 4325 | 7-1-2003 | TIRUCHY | 5:30 | CHENNAI | 13:20 |

*FIG. 5C*

| SOURCE WORD | TRANSLITERATION IN ENGLISH SCRIPT | SYNONYMS | TRANSLITERATION OF SYNONYMS |
|---|---|---|---|
| கூறினார் | KOORINAAR | சொன்னார் பேசினார் | SONAAR PAYSENAAR |

METHOD, APPARATUS, AND PROGRAM FOR TRANSLITERATION OF DOCUMENTS IN VARIOUS INDIAN LANGUAGES

This application is a continuation of application Ser. No. 10/645,037, filed Aug. 21, 2003 now U.S. Pat. No. 7,369,986, status, allowed.

BACKGROUND OF THE INVENTION

1. Technical Field

The present invention relates to data processing and, in particular, to text processing. Still more particularly, the present invention provides a method, apparatus, and program for transliteration of text in various Indian languages.

2. Description of Related Art

Many people in India are multilingual. About 400 million people speak Hindi and English or Urdu. Over 200 million people speak Hindi, Sanskrit, Urdu, English, or another regional language. Many have only a spoken/hearing understanding of even more languages. India has eighteen official languages—the total number of languages spoken is unknown—and the languages have numerous dialects. For example, Tamil alone has over 128 dialects. Languages vary from state to state and the scripts used by the languages are completely different.

The ability to speak and understand a locally used language is important for living and/or working in India. In addition, Indian languages are spoken by groups of people all over the world. People long to be able to communicate with others in their native language, some of whom may be halfway around the world for business or personal reasons.

A problem arises when a person has a knowledge of some Indian languages, but does not know the script that is used to represent this language. A person may understand a spoken Indian language, but may not be able to read documents written in the language. Additionally, a person may be looking for a name in a telephone directory, which is published in a different script. The user might know how a name is said, but might not know how it is represented in the other script.

Therefore, it would be advantageous to provide a mechanism for presenting a transliteration of a selected word, phrase, or document in a target language or script.

SUMMARY OF THE INVENTION

The present invention provides a mechanism that allows a user to view a text in one Indian language, to highlight a word or phrase, and to easily transliterate the selected word or phrase into a target language or script. The mechanism may be an application, an applet, or a plug-in to another application, such as a Web browser. The target language and/or script may be stored in a user profile. Preferably, the source language may be any known Indian language in any known script.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A-5C illustrate transliteration of an example text in a train schedule in accordance with a preferred embodiment of the present invention;

DETAILED DESCRIPTION OF THE PREFERRED EMBODIMENT

Figure 1:
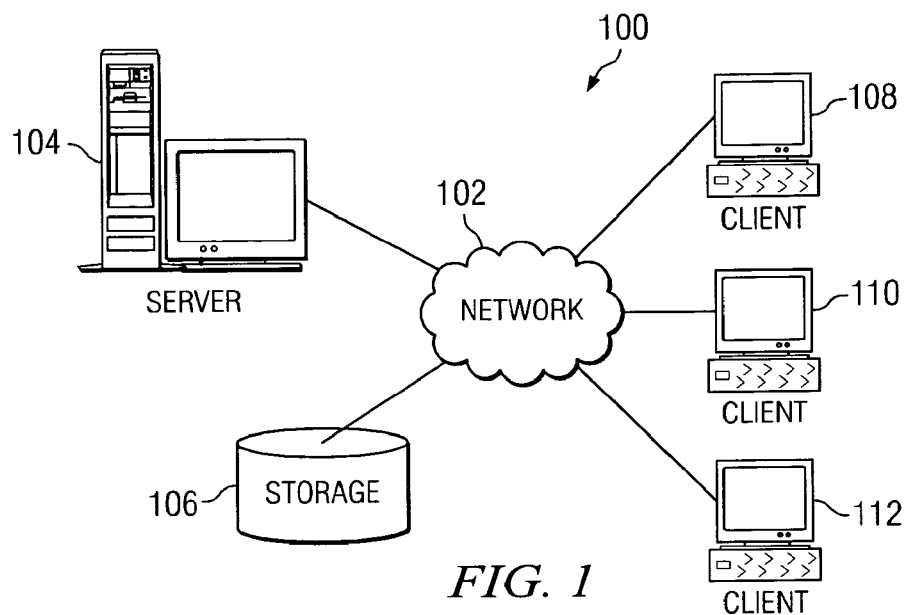
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In a preferred embodiment of the present invention, server 104 provides documents in one or more Indian languages and/or scripts to clients 108, 110, 112. For example, server 104 may be a Web server. Clients 108, 110, 112 may also receive textual content from other sources, such as, for example, removable storage media, peer-to-peer file sharing, or user input. A user of one of the clients may have an understanding of a spoken language, but may not understand the script in which the source language is written.

Thus, a mechanism is provided for transliteration of text from a source language and script to a target language and script. Transliteration, in a narrow sense, is a mapping from one script into another script. Transliteration is preferably lossless. In other words, the informed reader should be able to reconstruct the original spelling of unknown transliterated words. To achieve this, the transliteration mechanism must define complex conventions about how to transliterate letters that have no simple correspondence in the target script.

This is opposed to transcription, which maps the sounds of one language to the script of another language. Still, most transliterations map the letters of the source script to letters pronounced similarly in the target script, for some specific pair of source and target languages. If the relations between letters and the sounds are similar in both languages, a transliteration may be substantially the same as transcription. In a broader sense, and in the preferred embodiment of the present invention, transliteration includes both transliteration in the narrow sense and transcription.

Consider, for instance, the southern Indian languages Tamil, Kanada, Telugu, and Malayalam. These languages share a few words, but have different written scripts. A Tamil person may learn to understand Kanada more quickly than a person who is completely unfamiliar with the language. People traveling between states, such as students or business people, often pick up oral understanding of the language, but not written language. An individual may speak Tamil at home, even though that individual grew up in Eastern India. Therefore, that person may not have learned to read or write Tamil very well. Thus, there are many people in India or other places that have trouble understanding a document in written form, such as a telephone book or train schedule, even though the person may speak the source language of the document very well.

The number of Indian languages, dialects, and different written scripts makes the problem with Indian languages somewhat unique. With some languages or countries, a single one-to-one transliteration may be sufficient. One such example is the transliteration of text in the Cyrillic alphabet into the English or Roman script. However, Indian languages require the capability to perform a many-to-many or a many-to-one transliteration, because a person is likely to encounter many different languages in various written scripts or may be capable of reading or writing several written scripts.

The transliteration mechanism may exist on the server for transcoding server content. In an alternative embodiment, the transliteration mechanism may exist in the client as an application, applet, or application plug-in. More specifically, the transliteration mechanism of the present invention may be employed as a Web browser plug-in for transliterating selected textual Web content. The target language and script may be stored in a user preferences profile.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
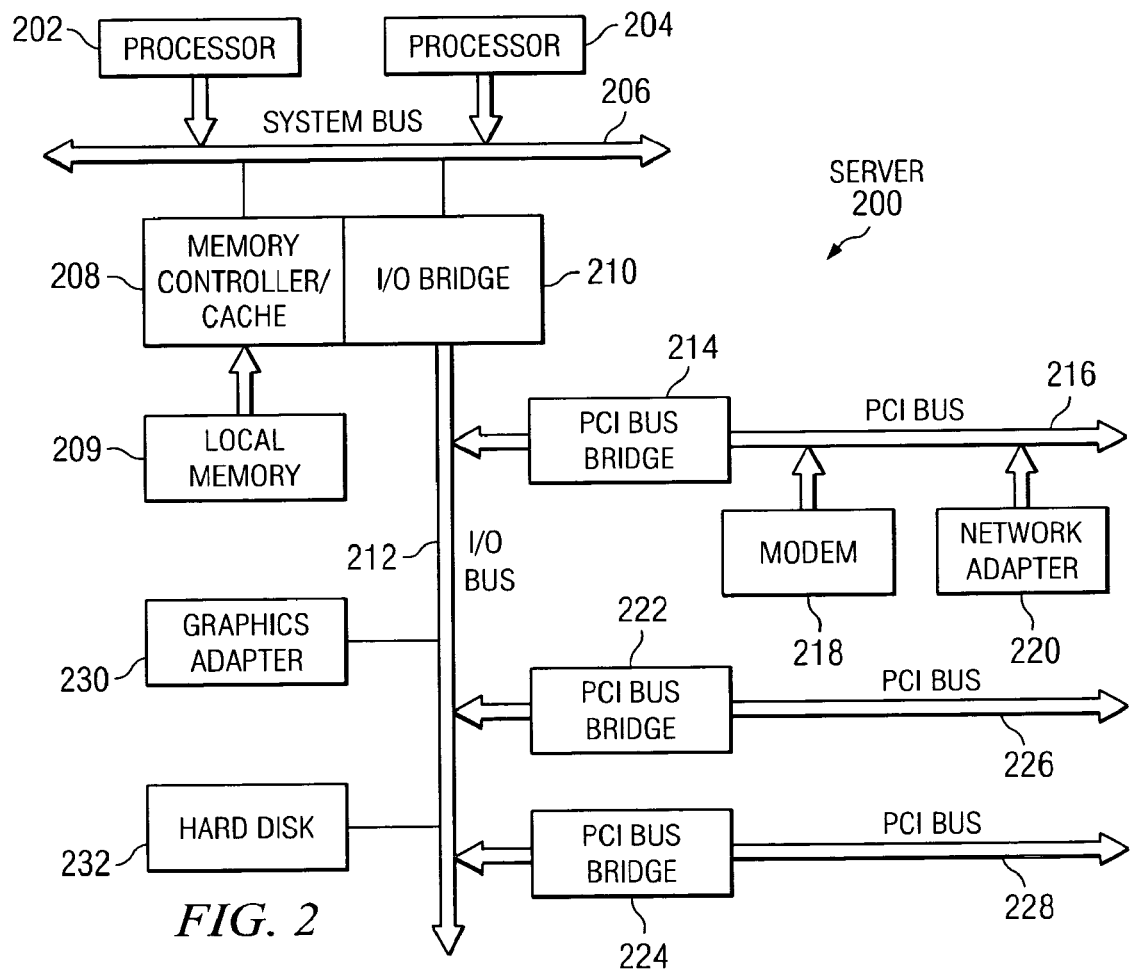
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer Pseries system, a product of International Business Machines Corporation in Armonk, N.Y., running the Advanced Interactive Executive (AIX) operating system or LINUX operating system.

Figure 3:
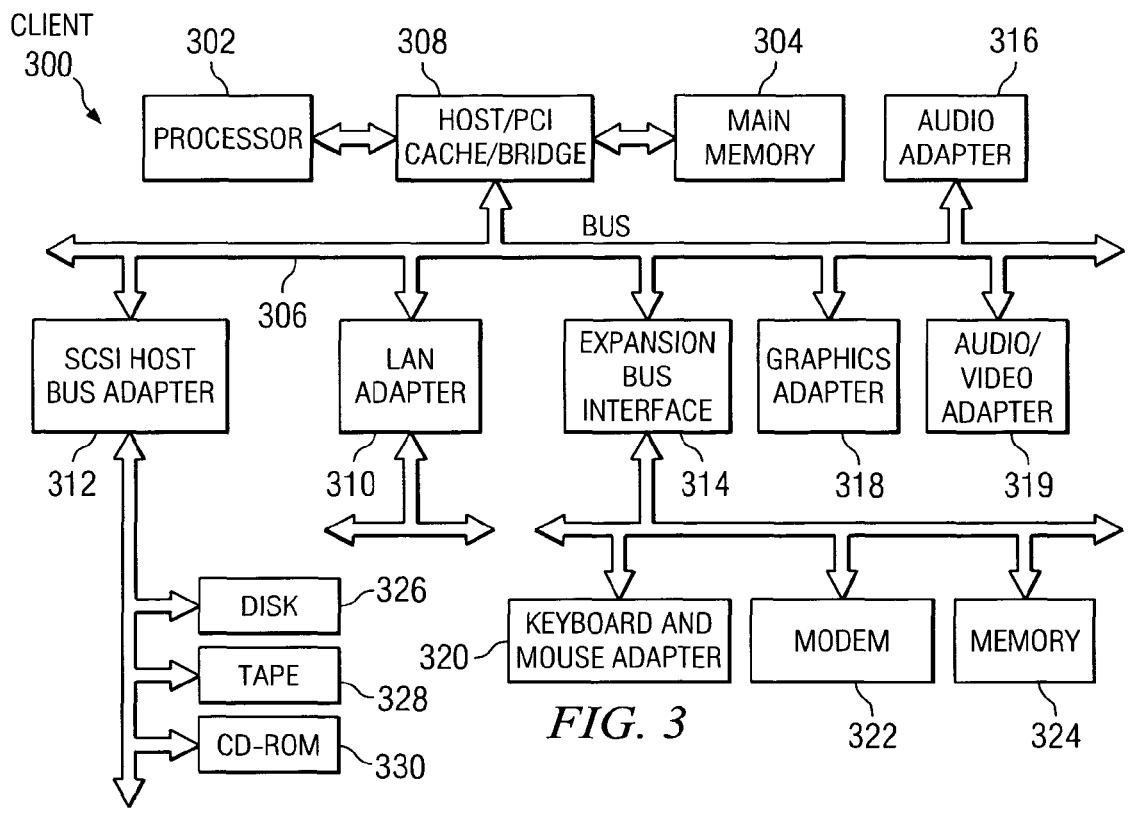
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
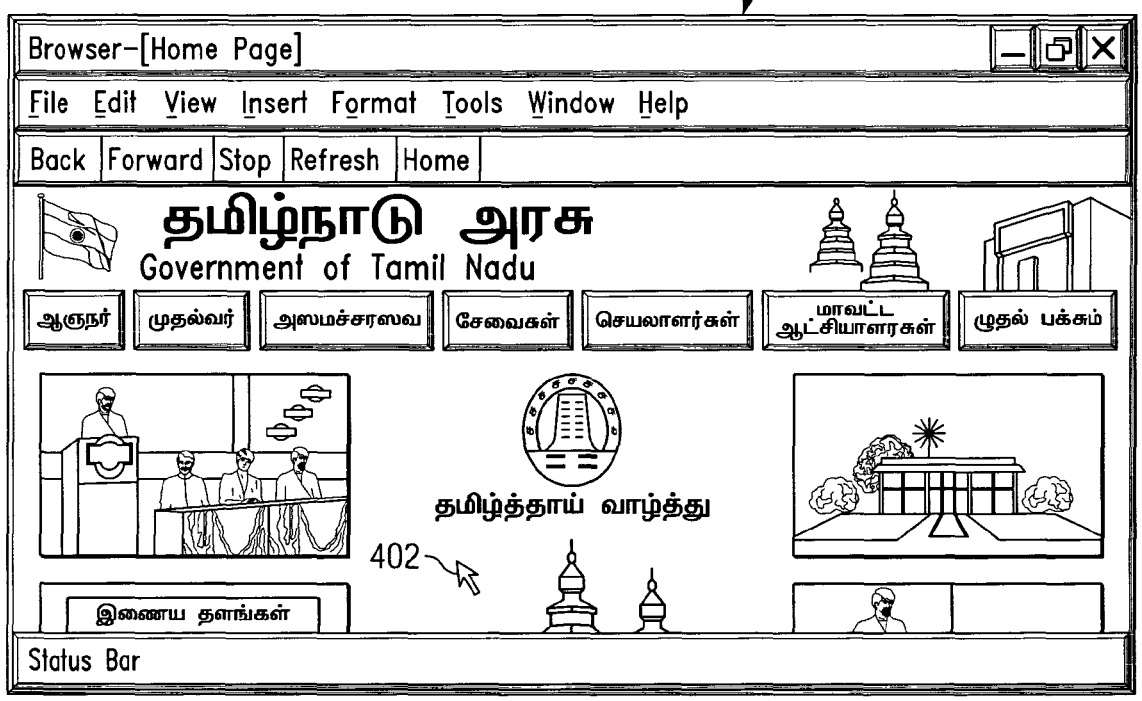
FIGS. 4A-4E illustrate example screens of display in accordance with a preferred embodiment of the present invention.

FIGS. 4A-4E illustrate example screens of display in accordance with a preferred embodiment of the present invention. More particularly, FIG. 4A illustrates a Web browser window 400, which displays a Web page with text content in Tamil. The Web page may be a hyptertext markup language (HTML) page with selectable links and controls. The user may select these links and controls using pointer 402.

Text in a HTML page is delimited by spaces, punctuation, and hypertext tags. For example, a hyperlink is delimited by the anchor tag. Thus, if a hyperlink is selected for transliteration, the text is parsed and the word or phrase is identified by examining the spaces, punctuation, and tags delimiting the word or phrase.

The present invention may use several conventions. If a user selects text by dragging pointer 402 over text and then activating the transliteration mechanism, then the highlighted text may be transliterated. However, if a user simply selects a word in the document, by right-clicking for instance, the mechanism may identify a single word, delimited by spaces and punctuation. Alternatively, the mechanism may identify a word or phrase delimited by hypertext tags. In another embodiment, the transliteration mechanism may identify the selected word or phrase using a combination of spaces, punctuation, and hypertext tags.

Figure 4B:
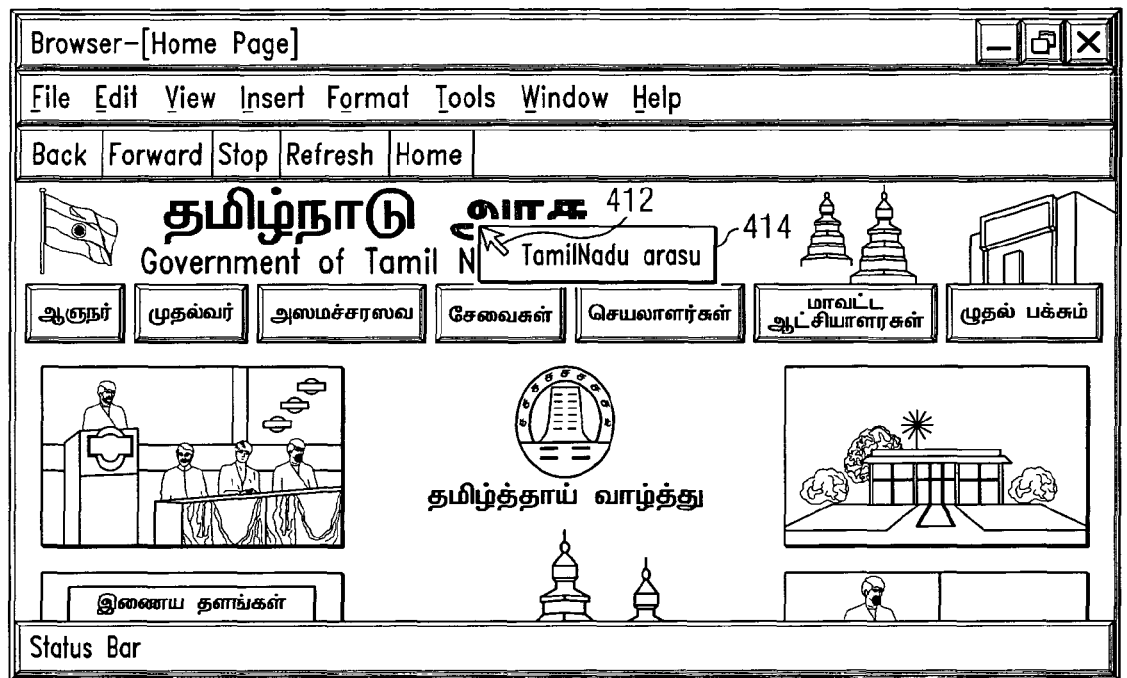

With reference to FIG. 4B, browser window 410 is shown illustrating a selected phrase and the resulting transliteration. In window 410, the user selects the header or title using pointer 412. The transliteration mechanism identifies the selected phrase as "தமிழ் நாடு அரசு," which is Tamil for "Tamil Nadu Government." This phrase may be identified by the user dragging pointer 412 over the phrase before activating the transliteration mechanism. Alternatively, the identified phrase may be delimited by header or title tags in the HTML document.

In this case, the user specifies that a preferred script is the Latin or English language script. In response to activation of the transliteration mechanism, the mechanism transliterates the phrase into the English language script. The transliterated text, "TamilNadu arasu," is displayed in a transliteration display portion 414. The transliteration display portion is preferably displayed at a location indicated by the pointer location; however, the transliteration portion may be displayed at another location on the screen, such as the center or just above or below the selected word or phrase.

Figure 4C:
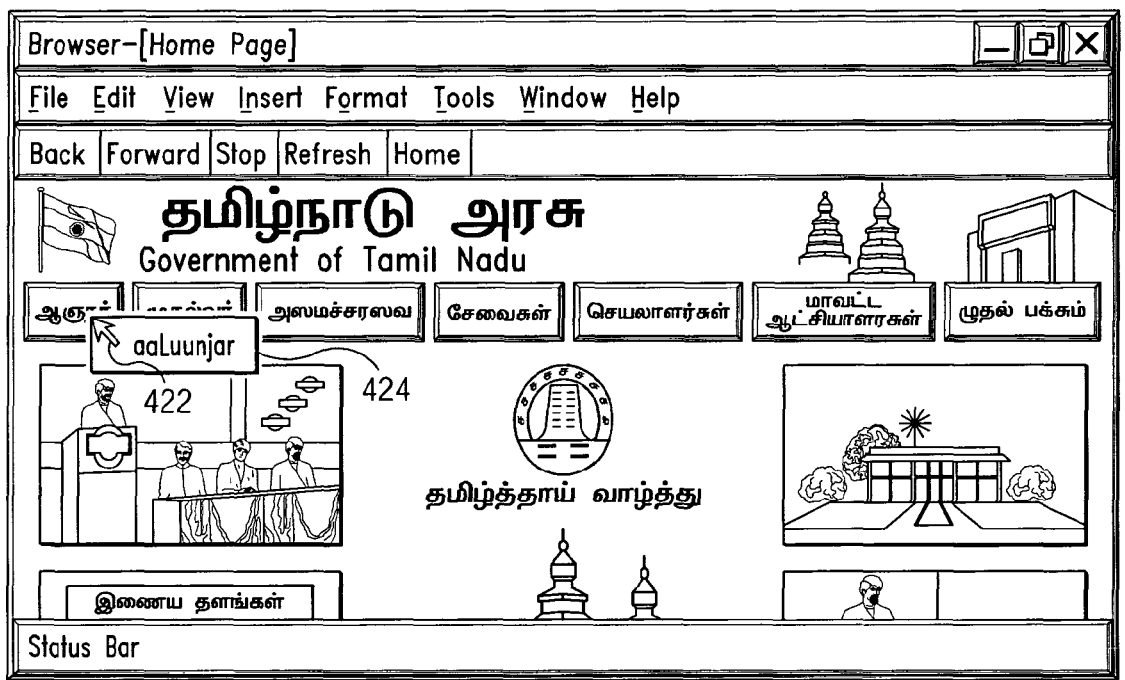

With reference now to FIG. 4C, browser window 420 is shown illustrating a selected phrase and the resulting transliteration. In window 420, the user selects a control or button using pointer 422. The transliteration mechanism identifies the selected phrase within the button control as "ஆளுநர்," which is Tamil for "Governor." This phrase may be delimited, for example, by button control tags in the HTML document. In response to activation of the transliteration mechanism, the mechanism transliterates the phrase into the English language script. The transliterated text, "aaLuunjar," is displayed in a transliteration display portion 424.

Figure 4D:
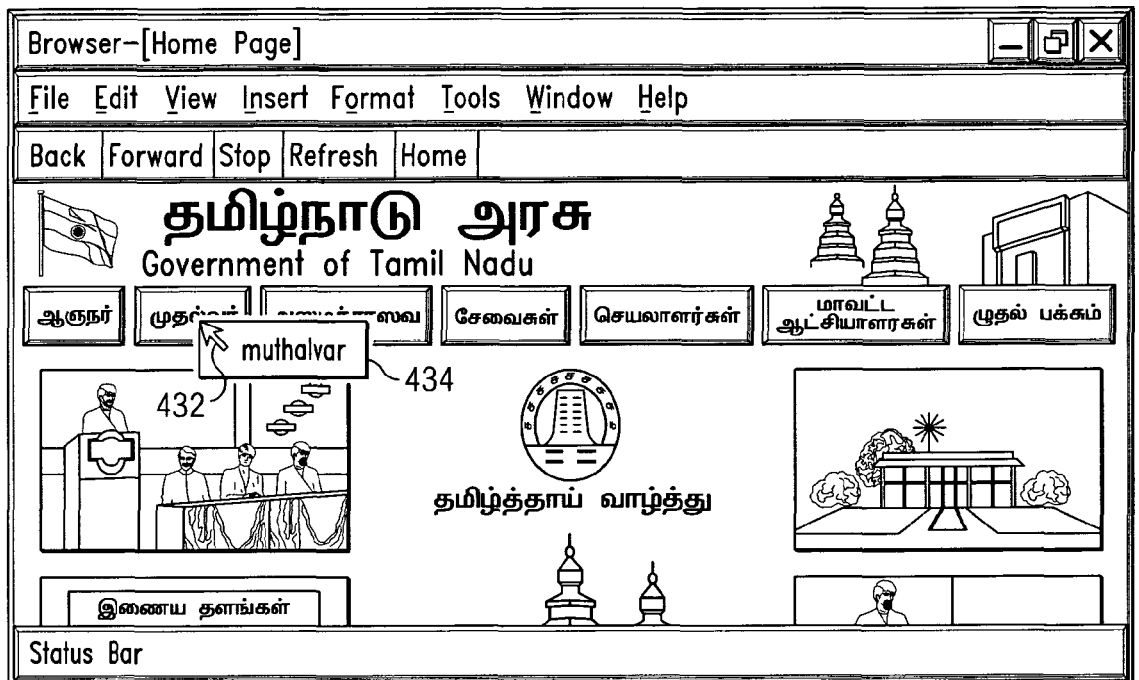

In another example shown in FIG. 4D, browser window 430 is shown illustrating a selected phrase and the resulting transliteration. In window 430, the user selects a control or button using pointer 432. The transliteration mechanism identifies the selected phrase within the button control as "முதல்வர்," which is Tamil for "Chief Minister." This phrase may be delimited, for example, by button control tags in the HTML document. In response to activation of the transliteration mechanism, the mechanism transliterates the phrase into the English language script. The transliterated text, "muthalvar," is displayed in a transliteration display portion 434.

Figure 4E:
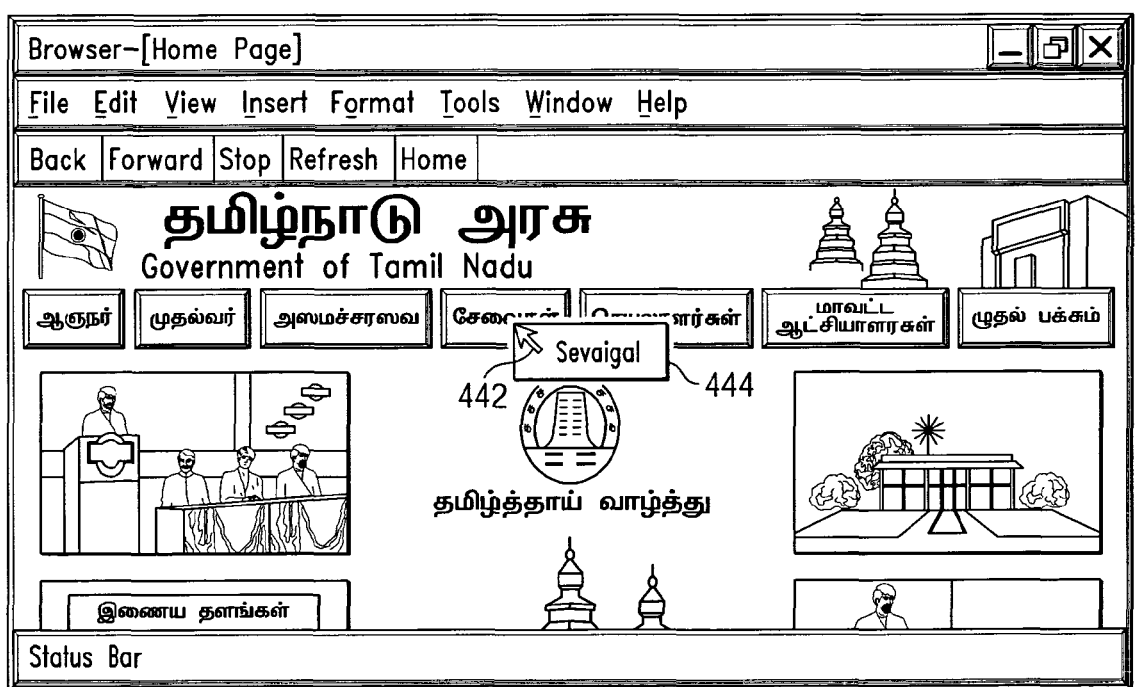

Turning now to FIG. 4E, browser window 440 is shown illustrating a selected phrase and the resulting transliteration. In window 440, the user selects a control or button using pointer 442. The transliteration mechanism identifies the selected phrase within the button control as "சேவைகள்," which is Tamil for "services." This phrase may be delimited, for example, by button control tags in the HTML document. In response to activation of the transliteration mechanism, the mechanism transliterates the phrase into the English language script. The transliterated text, "sevaigal," is displayed in a transliteration display portion 444.

FIGS. 5A-5C illustrate transliteration of an example text in a train schedule in accordance with a preferred embodiment of the present invention. More particularly, FIG. 5A illustrates a train schedule, in table form, wherein the text is in Tamil. The transliteration mechanism of the present invention may automatically transliterate the text in this table in accordance with a target language and script indicated in a user preferences profile.

In accordance with a preferred embodiment of the present invention, a user may activate the transliteration mechanism to transliterate the table shown in FIG. 5A. The user preferences profile may indicate that the target script is an English language script. The transliteration mechanism would then transliterate the Tamil text into the English language script. The resulting table is shown in FIG. 5B. Thus, while the user may not be able to read the Tamil language in the table of FIG. 5A, the user may be able to understand the same Tamil text as transliterated into the English language script, as shown in FIG. 5B.

In contrast, FIG. 5C illustrates the same train schedule table translated into the English language. A user who understands Indian languages may not be able to read or understand the words "Date," "City," or "Arrival Time." However, the user may be able to sound out words in the English language script and recognize the Tamil text in the table.

Figures 6, 7:
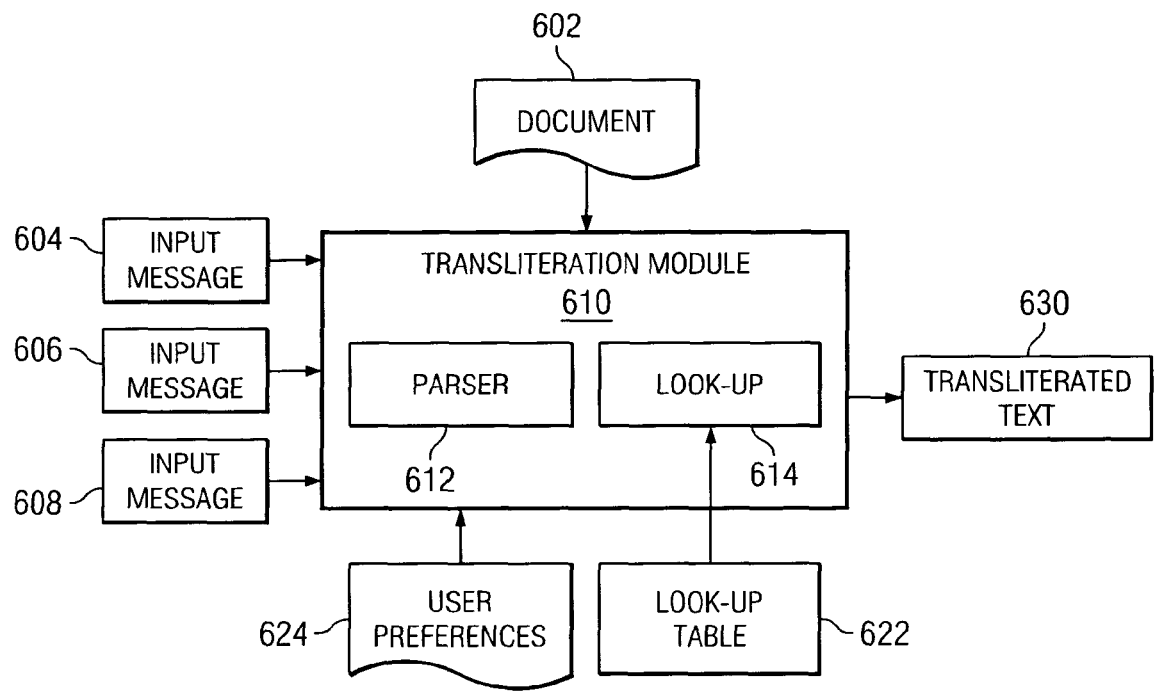
FIG. 6 is a pictorial representation of a transliteration mechanism in accordance with a preferred embodiment of the present invention.
FIG. 7 depicts an example entry in a transliteration look-up table in accordance with a preferred embodiment of the present invention.

With reference now to FIG. 6, a pictorial representation of a transliteration mechanism is shown in accordance with a preferred embodiment of the present invention. Transliteration module 610 receives document 602 as input. This document preferably includes text in one or more Indian languages.

The transliteration module also receives input messages 604, 606, 608. These input messages may be generated, for example, when the user depresses a key on a keyboard, moves a mouse or trackball, clicks a mouse button, or performs a right-click or double-click. Input messages 604, 606, 608 may activate the transliteration mechanism of the present invention. For example, the input messages may consist of a right-click and a right-click menu selection that invokes a transliteration command. As another example, the user may click and drag over a phrase and double-click to activate the transliteration mechanism. Other combinations of input messages may also serve to activate the transliteration mechanism within the scope of the present invention, as will be readily apparent to a person of ordinary skill in the art.

Transliteration module 610 includes parser 612 and look-up module 614. In response to activation, parser 612 parses the document and identifies the selected word or phrase. The parser identifies the selected source text as explicitly selected by the user or as delimited by spaces, punctuation, and/or tags within document 602. The transliteration module identifies a target language and script, which is stored in user preferences 624. Look-up table 614 looks up the transliterated text corresponding to the selected source text using look-up table 622. Transliteration module 610 then outputs the resulting transliterated text 630.

FIG. 7 depicts an example entry in a transliteration look-up table, such as look-up table 622, in accordance with a preferred embodiment of the present invention. The example shown in FIG. 7 is an entry for the word "told," which is "கூறினார்" in Tamil. For simplicity, only a transliteration to the English script is shown; however, in a preferred embodiment, transliteration to every known language and script will be included in the table.

The table entry in FIG. 7 also shows synonyms for the source word and transliterations for the synonyms. In a preferred embodiment of the present invention, a user may request for synonyms and transliterations of synonyms to be presented. For example, if the transliteration mechanism is activated through a right-click menu, the right-click menu may include a "synonyms" entry. In this case, the user may not recognize the word "koorinaar," but may have heard the word "sonaar" or the word "paysenaar." Thus, the use of synonyms may greatly help a user that has some understanding of the spoken language, but not a full exposure to the source language.

Figure 8:
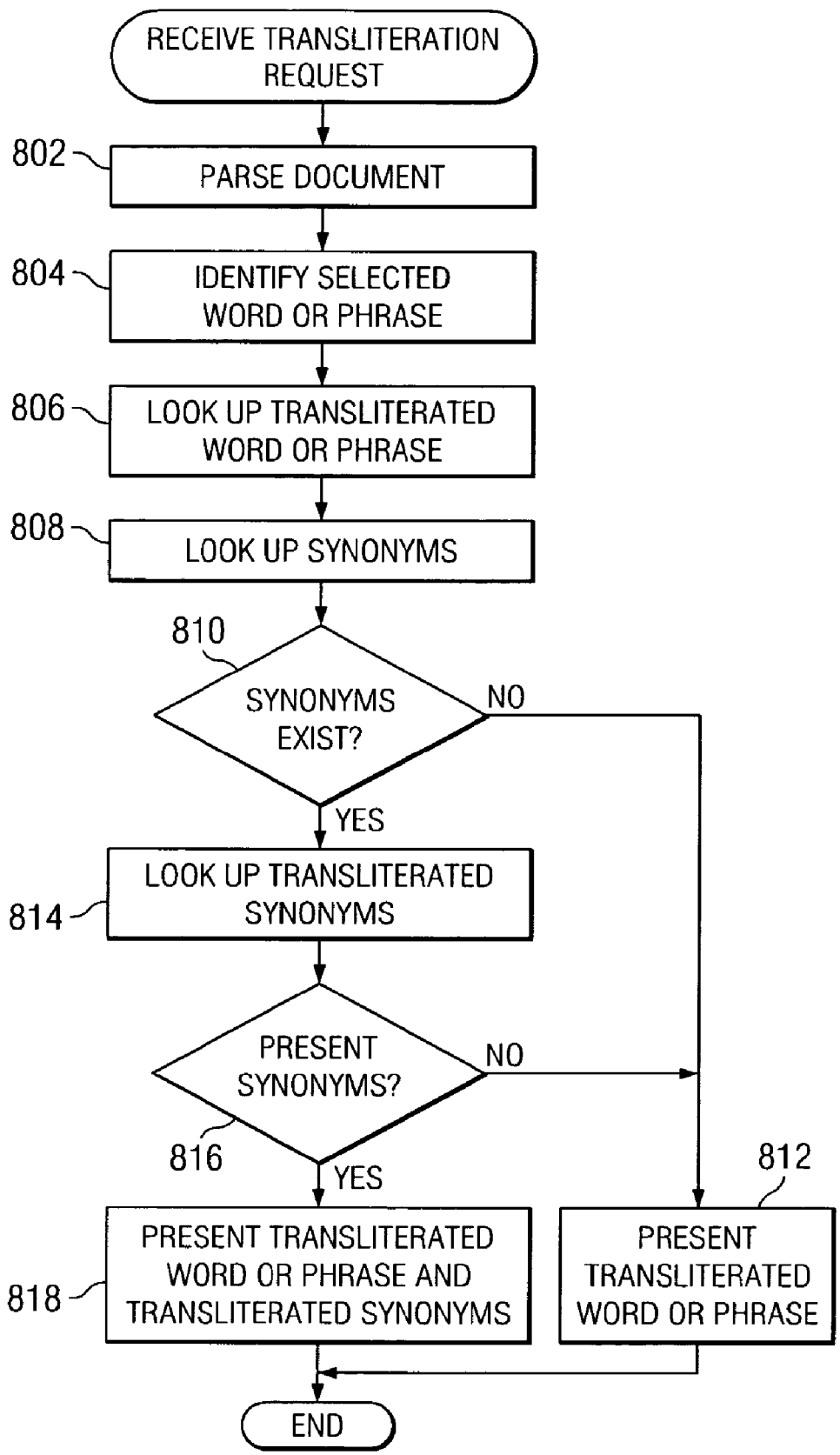
FIG. 8 is a flowchart illustrating the operation of a transliteration mechanism in accordance with a preferred embodiment of the present invention.

With reference to FIG. 8, a flowchart is shown illustrating the operation of a transliteration mechanism in accordance with a preferred embodiment of the present invention. The process begins when a transliteration request is received. The transliteration request may be received, for example, in response to a key sequence, menu selection, or mouse manipulation. The process then parses the document (step 802) and identifies a selected word or phrase (step 804). The transliteration mechanism of the present invention may identify the selected word or phrase using a combination of spaces, punctuation, and/or hypertext tags.

Then, the process looks up the transliterated word or phrase (step 806) and looks up synonyms for one or more source words (step 808). A determination is made as to whether synonyms exist (step 810). If no synonyms exist, the process presents the transliterated word or phrase (step 812) and ends.

If synonyms exist in step 810, the process looks up transliterated synonyms (step 814) and a determination is made as to whether the synonyms are to be presented (step 816). This determination may be made by prompting the user as to whether the user wishes to present synonyms. The user may also store a preference in a user preference profile and the determination may be made based on the stored user preference. If the synonyms are not to be presented, the process continues to step 812 to present the transliterated word or phrase. If, however, synonyms are to be presented, the process presents the transliterated word or phrase and transliterated synonyms (step 818) and ends.

Thus, the present invention solves the disadvantages of the prior art by providing a transliteration mechanism that is able to transliterate text from any source Indian language to a preferred target language and script. The mechanism may be an application, an applet, or a plug-in to another application, such as a Web browser. The target language and/or script may be stored in a user profile. Preferably, the source language may be any known Indian language in any known script. Therefore, a user may view various documents in various Indian languages of which the user has a limited understanding. The user may then select words of interest, such as difficult or uncommon words, and have those words transliterated into a form that may be more familiar and understandable.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for transliteration of text in Indian languages, the apparatus comprising:
   identification means for identifying a selected portion of a text in an Indian language; and
   transliteration means for transliterating the selected portion into a target script to form transliterated text, wherein the target script is another Indian language that is identified in a user profile, and the selected portion is transliterated into the target script using a look-up table that comprises a plurality of different transliterations for a plurality of different Indian languages.

2. The apparatus of claim 1, further comprising:
   presentation means for presenting the transliterated text.

3. The apparatus of claim 1, further comprising:
   means for identifying one or more synonyms of the selected portion;
   means for transliterating the one or more synonyms into the target script to form transliterated synonyms; and
   means for presenting the transliterated synonyms.

4. A computer readable, recordable-type media comprising program product code tangibly encoded therein, wherein the program product code is operable in a data processing system for transliteration of text in Indian languages, the computer readable, recordable-type media comprising:
- instructions for identifying a selected portion of a text in an Indian language; and
- instructions for transliterating the selected portion into a target script to form transliterated text, wherein the target script is another Indian language that is identified in a user profile, and the selected portion is transliterated into the target script using a look-up table that comprises a plurality of different transliterations for a plurality of different Indian languages.

5. The computer readable, recordable-type media of claim 4, further comprising:
- instructions for presenting the transliterated text.

6. The computer readable, recordable-type media of claim 4, further comprising:
- instructions for identifying one or more synonyms of the selected portion;
- instructions for transliterating the one or more synonyms into the target script to form transliterated synonyms; and
- instructions for presenting the transliterated synonyms.

* * * * *